(12) United States Patent
Mann

(10) Patent No.: US 9,581,367 B2
(45) Date of Patent: Feb. 28, 2017

(54) MULTI-FLUID PLATE HEAT EXCHANGER FOR A REFRIGERATION SYSTEM

(75) Inventor: Martin Mann, Filderstadt (DE)

(73) Assignee: Modine Manufacturing Company, Racine, WI (US)

( * ) Notice: Subject to any disclaimer, the term of this patent is extended or adjusted under 35 U.S.C. 154(b) by 1430 days.

(21) Appl. No.: 13/229,287

(22) Filed: Sep. 9, 2011

(65) Prior Publication Data

US 2012/0060550 A1    Mar. 15, 2012

(30) Foreign Application Priority Data

Oct. 9, 2010  (DE) .......................... 10 2010 048 015

(51) Int. Cl.
| | |
|---|---|
| F25B 40/00 | (2006.01) |
| F25B 39/00 | (2006.01) |
| F28D 9/00 | (2006.01) |
| F28F 9/02 | (2006.01) |

(52) U.S. Cl.
CPC .............. *F25B 39/00* (2013.01); *F28D 9/005* (2013.01); *F28D 9/0093* (2013.01); *F28F 9/0253* (2013.01); *F25B 40/00* (2013.01); *F25B 2500/18* (2013.01); *F28F 2280/06* (2013.01)

(58) Field of Classification Search
CPC ....... F25B 39/00; F25B 25/005; F25B 39/022; F28B 39/024; F28D 9/0093; F28F 9/0253
USPC .............. 62/513, 113, 238.6, 333, 335, 524; 165/140, 167
See application file for complete search history.

(56) References Cited

U.S. PATENT DOCUMENTS

| | | | |
|---|---|---|---|
| 4,327,802 A | | 5/1982 | Beldam |
| 5,333,470 A | * | 8/1994 | Dinh ............................... 62/333 |
| 5,462,113 A | | 10/1995 | Wand |
| 7,334,431 B2 | | 2/2008 | Persson |
| 7,762,090 B2 | * | 7/2010 | Lee .................................... 62/93 |
| 8,899,062 B2 | * | 12/2014 | Kadle et al. .................... 62/333 |

(Continued)

FOREIGN PATENT DOCUMENTS

| | | |
|---|---|---|
| DE | 69415710 | 5/1999 |
| EP | 1054225 B1 | 6/2007 |
| EP | 2174810 | 4/2010 |

OTHER PUBLICATIONS

English Translation of the First Office Action and the Text of the First Office Action from the State Intellectual Property Office of the People's Republic of China for Application No. 201110276522.0 dated Sep. 11, 2014 (8 pages).

*Primary Examiner* — Cassey D Bauer
(74) *Attorney, Agent, or Firm* — Michael Best & Friedrich LLP

(57) ABSTRACT

Heat exchanger systems described and illustrated here in include multiple stacked plates each defining an aperture, first and second flow ducts formed by the stacked plates, multiple inflow and outflow ducts formed by the apertures in the stacked plates, a first heat exchanger section defining a condenser including first and second flow ducts, a second heat exchanger section defining an evaporator, first, second and third fluids, and an expansion element for the first fluid connected to the heat exchanger. In some embodiments, the first fluid is in heat-exchanging contact with the second fluid in one of the first and second heat exchanger sections, the first fluid is in heat-exchanging contact with the third fluid in the other of the first and second heat exchanger sections, and/or the first fluid flows through the first flow duct in the first heat exchanger section.

21 Claims, 6 Drawing Sheets

(56) References Cited

U.S. PATENT DOCUMENTS

| | | | |
|---|---|---|---|
| 2003/0183378 A1* | 10/2003 | Memory | F28D 1/0476 165/153 |
| 2007/0125527 A1* | 6/2007 | Flik | F02B 29/0412 165/140 |
| 2008/0121381 A1* | 5/2008 | So | F28D 1/0333 165/140 |
| 2011/0185757 A1* | 8/2011 | Bittner et al. | 62/216 |
| 2011/0213305 A1* | 9/2011 | Jonsson et al. | 604/113 |

* cited by examiner

FIG. 6
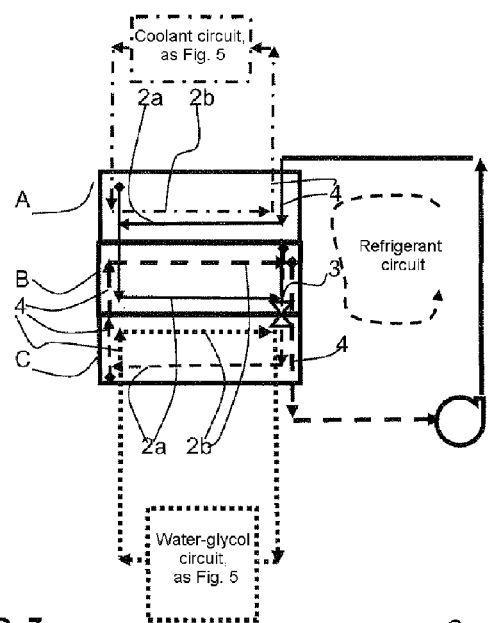
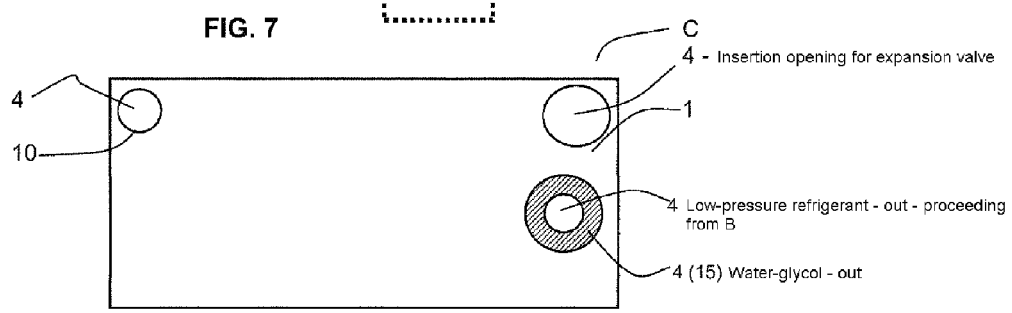
FIG. 7

MULTI-FLUID PLATE HEAT EXCHANGER FOR A REFRIGERATION SYSTEM

CROSS REFERENCE TO RELATED APPLICATIONS

This application claims priority to German patent application DE 10 2010 048 015.0, filed Oct. 9, 2010, the entire contents of which are herein incorporated by reference.

BACKGROUND

The invention relates to a system having a heat exchanger.

A heat exchanger has been described in WO 95/35474 A1. In said heat exchanger, two refrigerants and a coolant are in heat-exchanging contact. In said publication, it is regarded as being advantageous that each flow duct for the first and for the second refrigerant is in heat-exchanging contact, at its two flat sides, with the third fluid, specifically with the coolant. The plates and the flow ducts are designed accordingly, and are arranged in the manner described and presented in said document.

In the heat exchanger according to DE-A-3 017 701, four fluids participate in the exchange of heat, wherein one of said fluids is cooling air which can flow freely through one section of the heat exchanger.

EP 1 054 225 B1 presents and describes an absorption refrigeration machine. One component of said refrigeration machine is used as a recovery heat exchanger. Said heat exchanger also has a plurality of heat exchanger sections formed from a plurality of plates or flow ducts. It is provided in EP 1 054 225 B1 that a fluid is placed in heat exchanging contact, in one heat exchanger section, first with a second fluid and, in another heat exchanger section, with a third fluid.

For example, in a motor vehicle, there is often provided an air-conditioning system which has an air-conditioning circuit through which a refrigerant flows and which comprises a condenser, evaporator, expansion valve and compressor, and in some cases, also an intermediate heat exchanger. Furthermore, a cooling or temperature control system having a liquid coolant for the drive engine, for the operating fluids thereof and if appropriate for further auxiliary units is generally provided.

SUMMARY

Some of the systems previously mentioned have been combined with one another in order to eliminate certain disadvantages. Advantages of these combinations usually consist in a shortening of the cold-start times of the drive engine, a reduction in fuel consumption and/or in a reduction in system costs. It is possible, by means of some combinations, for some heat exchangers to be dispensed with, because other heat exchangers are utilized more intensively.

It is an object of the invention to provide a system having a heat exchanger, by means of which the concept of installation space reduction and cost saving is further developed.

An aspect of the invention is that one heat exchanger section is constructed as a condenser, through a first flow duct of which a refrigerant as a first fluid flows, that another heat exchanger section is constructed as an evaporator, through a first flow duct of which the first fluid flows, and that an expansion element is arranged, at least so as to be operatively connected to the heat exchanger, between the condenser section and the evaporator section.

Such a system can contribute to a reduction in installation space and to a cost saving. Also, according to a feature of the invention, is the integration of an expansion element, as a result of which lines and ports can be dispensed with. The expansion element is preferably arranged in one of the vertical supply ducts of the heat exchanger in order to make the latter more compact. The heat exchanger sections can have a plurality of stacked plates that form horizontal flow ducts in the sections. Furthermore, a further heat exchanger section for an intermediate heat exchanger may be provided in the heat exchanger.

A further aspect of the system according to the invention is that the cooled liquid coolant exiting the evaporator section can be easily transported, not least because it can be dynamically deflected, to the points at which cooling/temperature control or air conditioning is desired. No additional evaporator need be provided at the locations mentioned, as is required in many prior art systems.

The system may be used for example in motor vehicles, preferably with electric or hybrid drive.

Furthermore, other features and further advantages will emerge from the following description of exemplary embodiments which will be given on the basis of the appended drawings.

BRIEF DESCRIPTION OF THE DRAWINGS

FIG. 6 shows another system according to some embodiments of the invention;
FIG. 7 shows a schematic view of the lower plate of the evaporator.

DETAILED DESCRIPTION

The system according to the invention in the following exemplary embodiments may be installed into a motor vehicle. Said system could however likewise be part of a static system.

Figure 1:
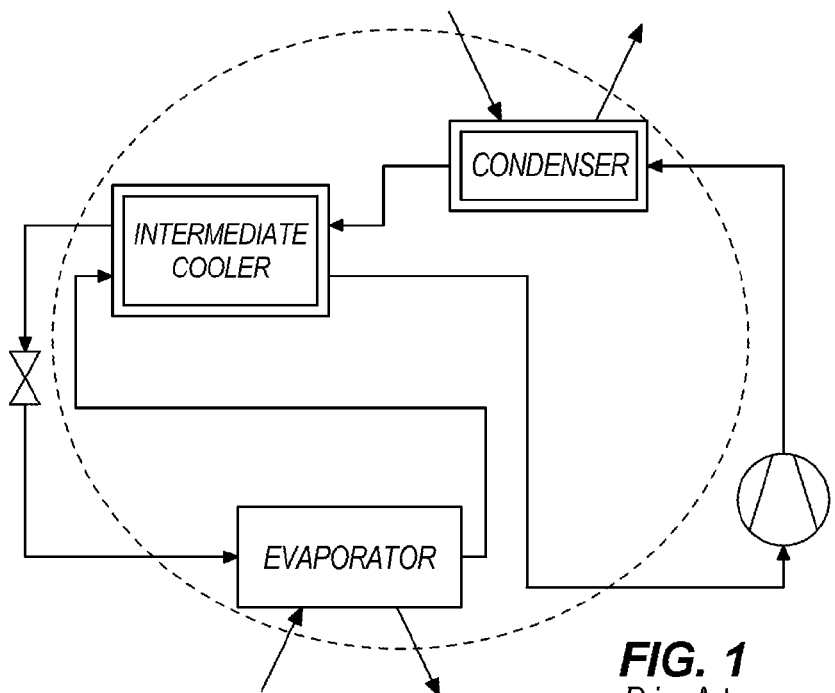
FIG. 1 is a schematic of a refrigerant circuit.
Figure 2:
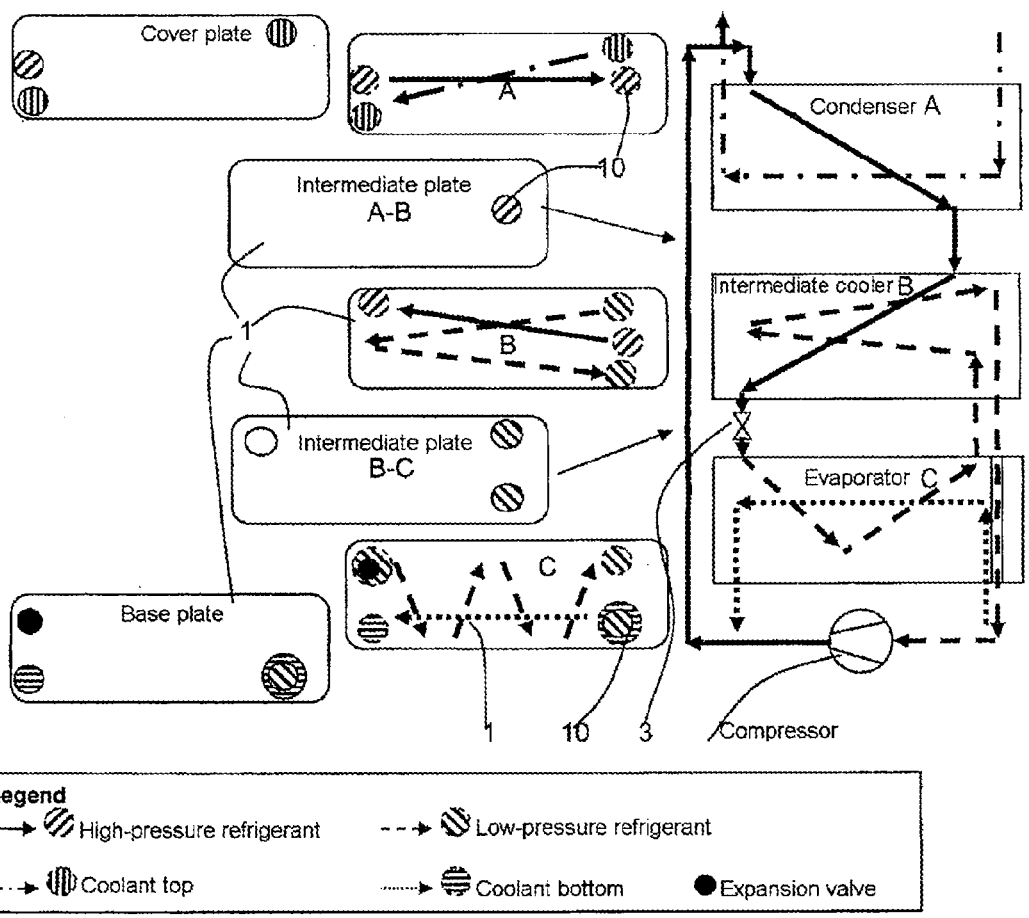
FIG. 2 shows a part of a first exemplary embodiment of the invention.

FIG. 2 has been assigned a legend containing the symbols used in the following figures for the different features and elements, such that the illustrations in said figures would be understood by a person of ordinary skill in the art.

The core of the proposed system is the heat exchanger, which is composed of stacked plates 1 and of flow ducts 2a, 2b (schematically represented by arrows in the figures) formed from the plates 1. The flow ducts 2a, 2b are hydraulically connected to corresponding supply and discharge ducts 4 (see FIGS. 5-6). The supply and discharge ducts 4 extend perpendicular to the planes of the plates, or perpendicular to the flow ducts 2a, 2b. The plates 1 have corresponding apertures 10 which lie one above the other in the plate stack, as a result of which the vertical supply and discharge ducts 4 are formed (see also FIG. 9 or 10). Three different fluids, a refrigerant such as for example R134a and two liquid coolants, flow in the heat exchanger. The heat exchanger has at least two heat exchanger sections. Each heat exchanger section has a plurality of horizontal flow ducts 2a, 2b formed from said plates 1, specifically a multiplicity of first and second flow ducts 2a, 2b which keep the heat-exchanging fluids separate from one another. The flow through the heat exchanger sections is thus such that the refrigerant, as first fluid, flows first through the first flow ducts 2a of one heat exchanger section which is designed as condenser A. Supercooling of the refrigerant can also be carried out in the condenser A (see also FIG. 9). The refrigerant thereafter flows either into the first flow ducts 2a of a heat exchanger section formed as intermediate heat exchanger B, as shown in FIG. 2 to 4 or 6, or directly into the first flow ducts 2a of a heat exchanger section formed as an evaporator C. In the intermediate heat exchanger B, the high-pressure refrigerant exiting the condenser A is in heat-exchanging contact with the high-pressure refrigerant exiting the evaporator C, as a result of which the supercooling of the refrigerant exiting the condenser A can be further intensified, or at any rate the temperature of said refrigerant can be lowered further and the efficiency of the system as a whole can be improved. The illustrated intermediate heat exchanger B is arranged between the condenser A and the evaporator C, because said type of arrangement permits a simpler plate design. It is however not ruled out that the intermediate heat exchanger B may be located on the top or bottom edge of the heat exchanger unit. Said intermediate heat exchanger can adjoin the evaporator C in order to be able to introduce the expansion element 3.

Figure 3:
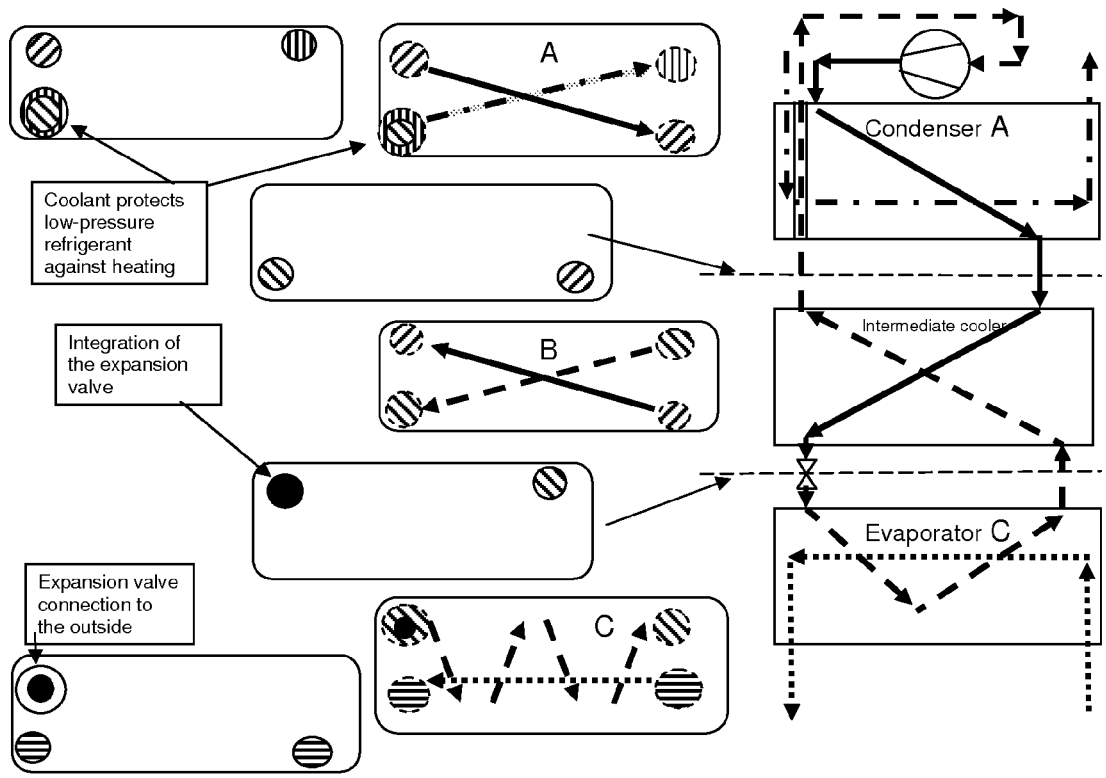
FIG. 3 shows a part of a second exemplary embodiment of the invention.
Figure 4:
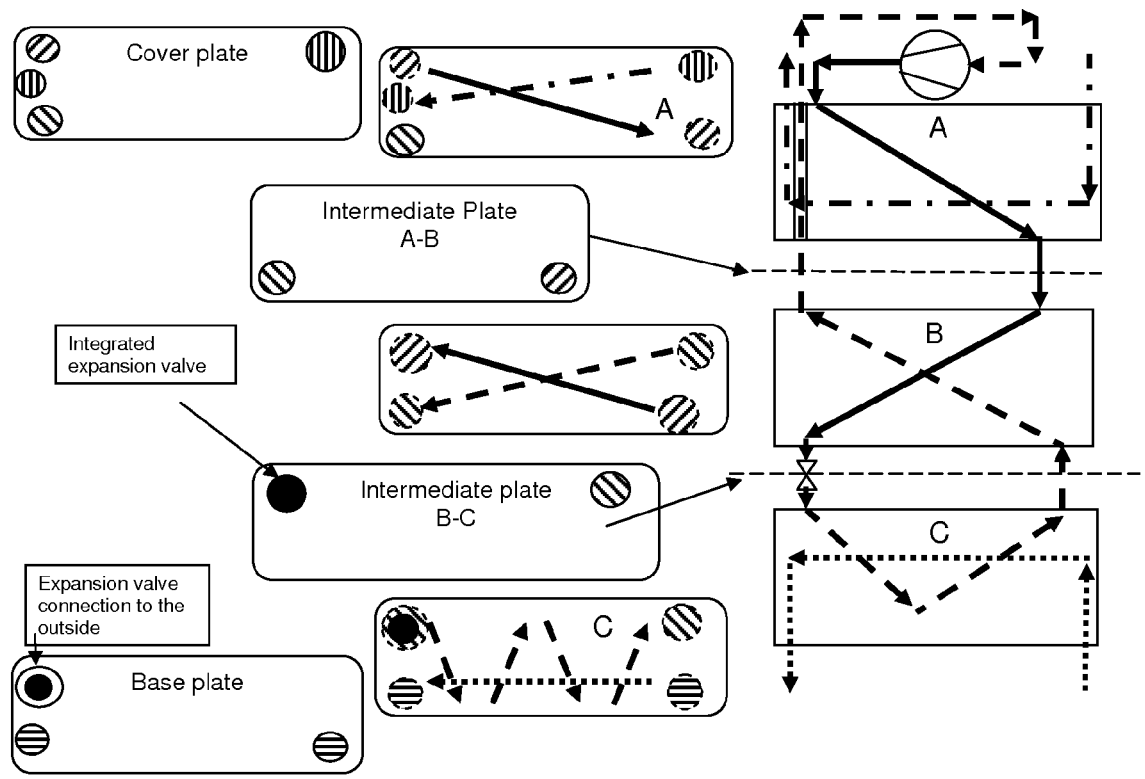
FIG. 4 shows a part of a third exemplary embodiment of the invention.

In the exemplary embodiments shown in FIGS. 2 to 4, the expansion element 3 is arranged between the heat exchanger sections of the intermediate heat exchanger B and of the evaporator C. In the diagrammatic illustration of FIG. 5, no intermediate heat exchanger B is provided and the expansion element 3 is integrated in the supply duct 4 of the evaporator C. An opening of the supply duct 4 is left open after the heat exchanger is produced for example by soldering. The opening extends to the outside and the expansion element 3 is inserted through the opening and correctly fastened, after which the insertion opening of the supply duct 4 is correctly closed (see also FIG. 10).

The expansion element 3 may extend into an aperture 10 of an intermediate plate and may therefore partially also be arranged in the discharge duct 4 of the intermediate heat exchanger B or else of the condenser A. As shown in the figures, in each case one such intermediate plate A-B and B-C is arranged between the sections.

In another embodiment, the expansion element 3 is fastened at the outside to the heat exchanger and is connected into the refrigerant circuit between the outflow duct and the inflow duct by means of corresponding lines, such that said expansion element is also arranged so as to be operatively connected between the condenser section A and the evaporator section C.

The flow ducts 2a, 2b may be designed with regard to their internal configuration for the task to be performed in each case, which means that they need not have an identical configuration over their entire length. This may be achieved by means of corresponding design of the bases of the plates 1 and/or by means of specially designed inserts in the flow ducts 2. In an evaporator C, it may be advantageous for those chambers in the regions of the first flow ducts 2a in which a phase change has already taken place, that is to say in which a high vapor fraction is already present, to be designed to be larger than the chambers in the upstream regions in which predominantly liquid is still present. A similar situation applies to the first flow ducts 2a of the condenser A into which a gas enters which exits the condenser at least predominantly as liquid. This paragraph however should not be understood to mean that it is imperative for a refrigerant to be used which cyclically changes its state of aggregation. Accordingly, the condenser could also be a gas cooler, and the refrigerant could for example be $CO_2$.

Figure 5:
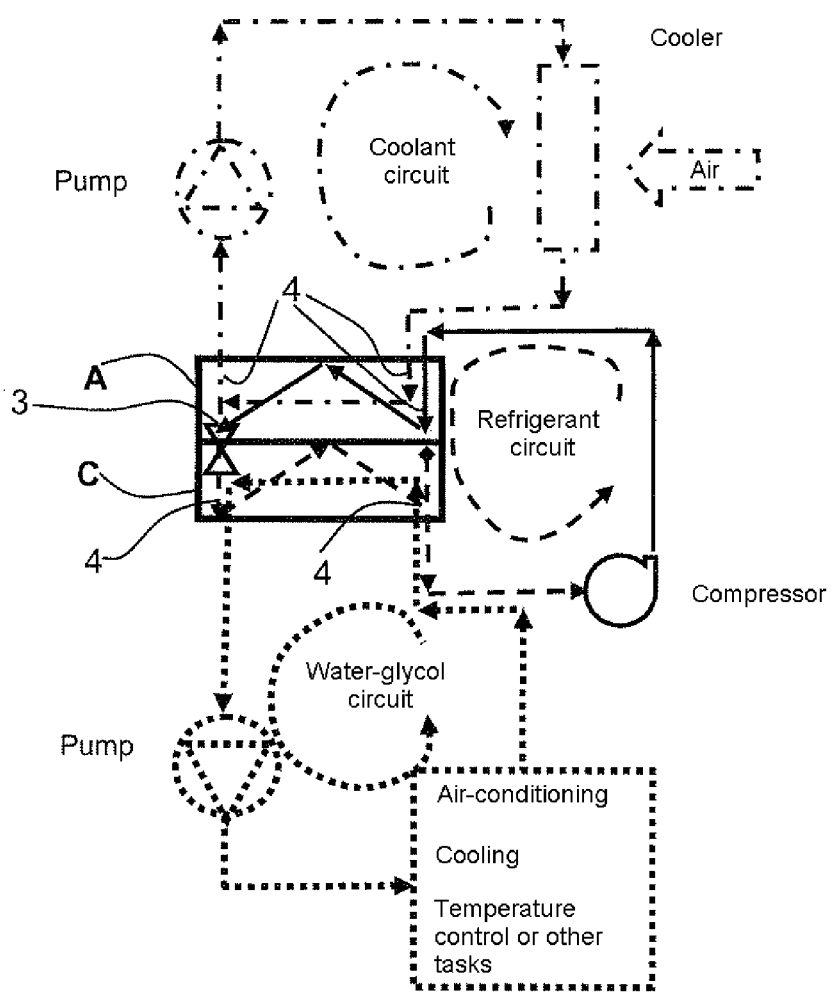
FIG. 5 shows a system according to some embodiments of the invention.

FIG. 5 shows the system as a whole in a diagrammatic illustration. Here, the heat exchanger which is constructed from plates 1 comprises merely a condenser A and an evaporator C. Here, too, the expansion element 3 is located in the supply duct 4 of the evaporator C for the refrigerant. The dashed arrow lines (low pressure) and solid arrow lines (high pressure) represent the refrigerant circuit, which comprises a compressor. The high-pressure side of the circuit begins downstream of the compressor in the flow direction of the refrigerant. The low-pressure side of the circuit follows downstream of the expansion valve 3—in the direction of the compressor. The arrow lines extending vertically into or out of the evaporator C and the condenser A may be understood to be the said discharge and supply ducts 4. A liquid coolant flows through the second flow ducts 2b of the condenser A in order to cool and condense the refrigerant which has been raised to a considerable temperature as a result of the compression in the compressor. The liquid coolant flows in a coolant circuit shown by dash-dotted lines, having a pump and having a cooler which, in the embodiment shown, is air-cooled.

Through the second flow ducts 2b of the evaporator C there flows for example a water-glycol mixture, or at any rate a liquid which can be brought to a very low temperature in the evaporator C without freezing. Said liquid flows in a circuit (likewise illustrated) which is illustrated by dotted lines and which comprises a pump—such as an electrically operated pump—and a plurality of consumers, which have been labeled merely by their intended purpose, for example air-conditioning of a compartment, cooling/temperature control of an electric battery etc. In practical terms, this means that further heat exchangers and other elements are located in said circuit in order to be able to perform the stated tasks. However, an additional evaporator is not required. During the execution of the tasks assigned to the cold liquid, said liquid will warm up and must be cooled again, for which reason it circulates in the circuit by means of the electric pump through the second flow ducts 2b of the evaporator C.

FIG. 6 differs from FIG. 5 merely in that an intermediate heat exchanger B has been provided again. The flow ducts 2a and 2b in the sections have been indicated. The slightly thicker dashed arrow lines are intended to indicate the refrigerant exiting the evaporator C, which refrigerant flows through the intermediate heat exchanger B in order to further cool the high-pressure refrigerant, illustrated by the solid arrow lines, from the condenser A, which then enters via the expansion element 3 into the evaporator C.

FIG. 2 differs from FIG. 3 by the guidance of the low-pressure refrigerant in the circuit towards the compressor. In FIG. 2, the low-pressure refrigerant is conducted through plate openings 10 in the plates 1 which form the evaporator C. That is to say, the refrigerant flows back out of the intermediate heat exchanger B, through a duct in the evaporator C, said duct being formed by said plate openings, and enters into the compressor below the heat exchanger. In contrast, in FIG. 3, the low-pressure refrigerant is conducted through a duct which is formed by openings 10 in the plates 1 which form the condenser A. The refrigerant does not flow back out of the intermediate heat exchanger B, but rather flows further upward, through said duct in the condenser A and into the compressor which is shown above the heat exchanger.

In FIG. 4, the throughflow direction of the liquid coolant in the condenser A was in a counter-current flow configuration with the high-pressure refrigerant. In FIG. 3, the flow passes through the condenser A in a co-current flow configuration.

To prevent the coolant from being warmed up again in the condenser A, it is advantageous for the duct, which extends through the condenser A, for the refrigerant to be arranged coaxially in the supply duct 4 for the cold coolant of the condenser A, as indicated in FIG. 3. A similar configuration is provided in FIG. 2 with regard to the duct through the evaporator C for the refrigerant from the intermediate heat exchanger B. In contrast, FIG. 4 need not have the coaxial arrangement, for which reason the plates 1 there have additional apertures 10. This also applies to the exemplary embodiment according to FIG. 6.

FIG. 7 is a view from below the final plate 1 of the evaporator C, and shows the above mentioned coaxial arrangement of the discharge duct 4 for the refrigerant in the discharge duct 4 for the cold liquid emerging from the evaporator C. The other supply and discharge ducts 4 in the plate 1 have also been depicted.

Figure 8:
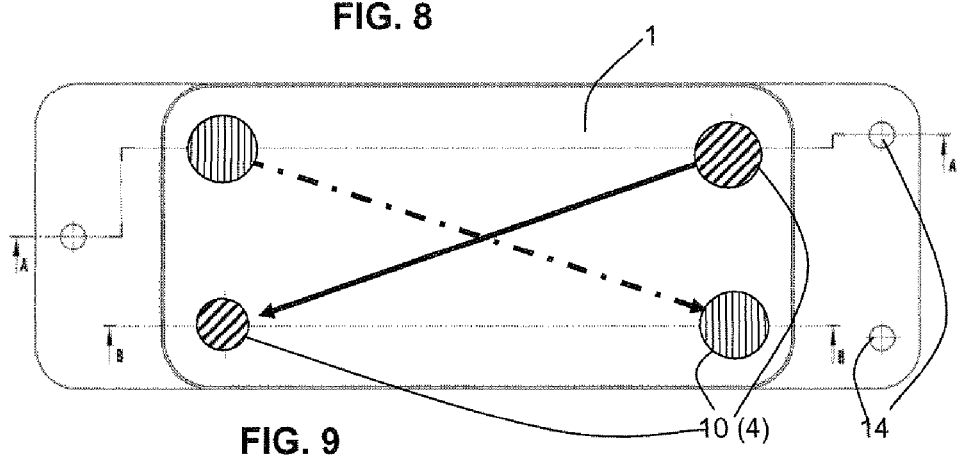
FIG. 8 is a plan view of an exemplary embodiment.
Figure 9:
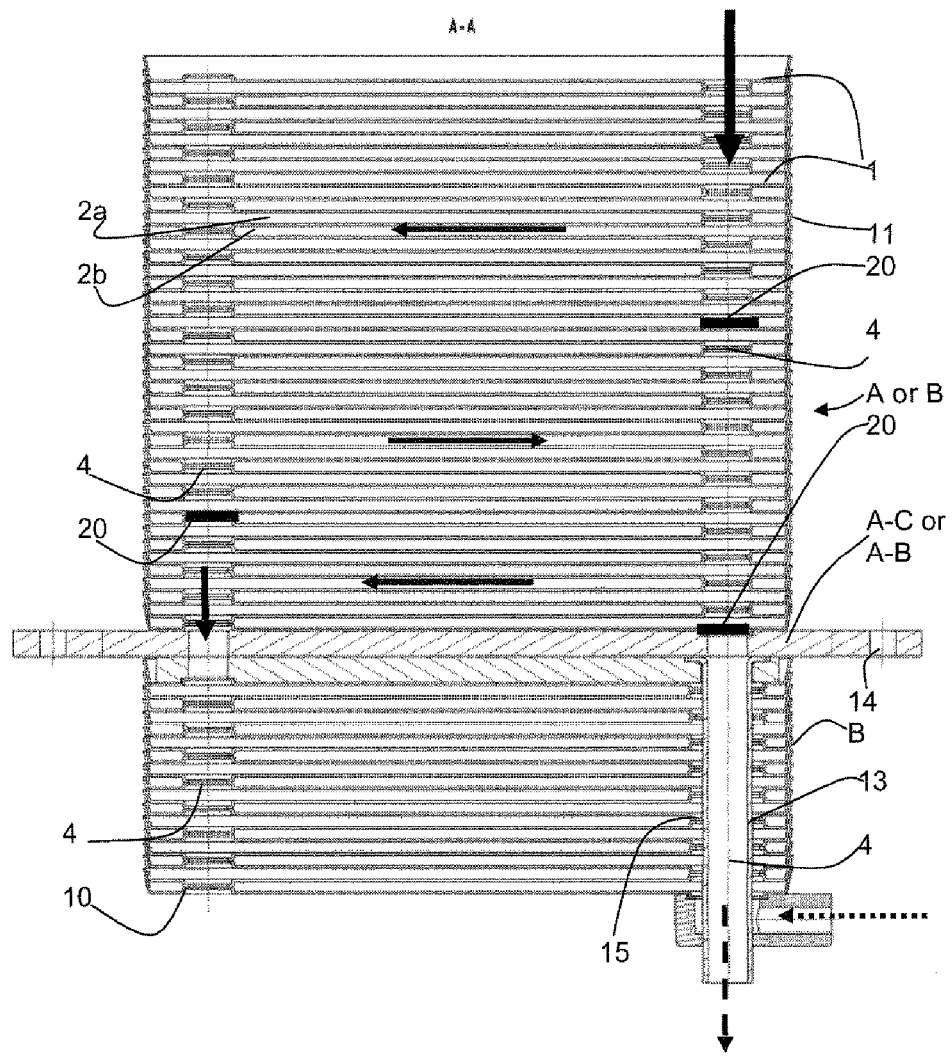
FIG. 9 is a cross-sectional view taken along line A-A of FIG. 8, but illustrating another exemplary embodiment.
Figure 10:
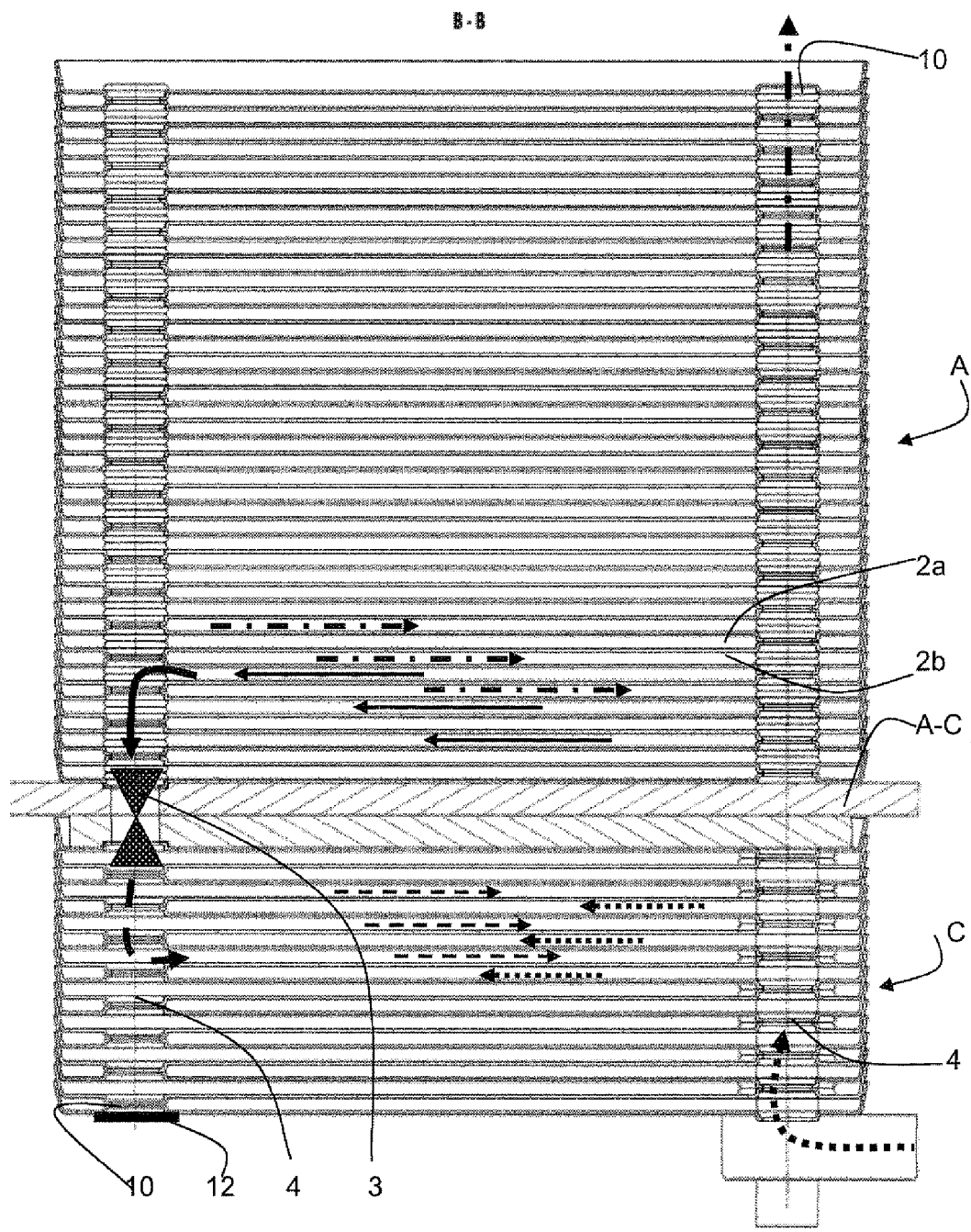
FIG. 10 is a cross-sectional view taken along line B-B of FIG. 8, but illustrating another exemplary embodiment.

FIGS. 8-10 show a heat exchanger as the main part of the system, wherein FIG. 8 is a plan view of the heat exchanger according to an embodiment of the invention, and FIGS. 9 and 10 could illustrate sections through the heat exchanger. FIGS. 9 and 10 however in fact illustrate different exemplary embodiments. They serve primarily for the following explanation of further details. All of the illustrated heat exchanger plates 1 have been formed with an obliquely turned-up encircling edge 11, such that they are automatically centered when the plates 1 are stacked. The entire preassembled heat exchanger, after corresponding preparation, is connected in an inherently sealed and fixed manner for example by means of a soldering process. In the exemplary embodiment shown, the upturned edge 11 in the two illustrated heat exchanger sections A, C points upward. Situated in between are two intermediate plates, for example A-C, wherein the upper intermediate plate is simultaneously designed for the fastening of the heat exchanger, for which reason it protrudes in the longitudinal direction of the plates 1, and is provided with corresponding holes 14 in order to be able to attach fastening means, for example. The lower intermediate plate serves to bridge the edge height of the heat exchanger plate 1 arranged therebelow.

In a further exemplary embodiment, the plates 1 in the heat exchanger sections have been arranged with their edges 11 pointing in opposite directions—for example pointing upward in the upper section and pointing downward in the lower section, such that the second intermediate plate can be dispensed with.

Furthermore, FIG. 9 shows a pipe 13, situated in a duct 4 of the lower section, as a part of the above mentioned coaxial arrangement in order to prevent the undesired exchange of heat between the fluids. The refrigerant can flow in or out through the interior of the pipe 13. A water-glycol mixture or another coolant can flow in or out through an annular gap 15 between the pipe 13 and the openings 10. The throughflow may also be such that the coolant flows through the pipe 13 and the refrigerant flows through the annular gap 15. The upper section could also be an intermediate heat exchanger B. It would then be possible for the low-pressure refrigerant to flow out of the intermediate heat exchanger B through the pipe 13 to the compressor. The barrier 20 situated above the pipe 13 would in this case not be provided at this location.

If, with regard to FIG. 9, it is assumed that the upper section constitutes a condenser A and that one duct 4 is the inlet duct and the other duct is the outlet duct 4 for the high-pressure refrigerant, the high-pressure refrigerant can flow through said condenser in a plurality of parallel passes of decreasing magnitude, which is intended to be indicated by the plotted arrows and the mentioned barriers 20 arranged in the ducts 4. Desired supercooling, as already mentioned above, of the refrigerant can be achieved in this way. For the assumptions made here, a section would have to run diagonally through the heat exchanger, that is to say on the solid arrow (in FIG. 8).

FIG. 10 can be understood to be a heat exchanger which has an upper section also constructed as a condenser A and a lower section which constitutes the evaporator C, wherein the illustrated sizes of the sections A, C determined by the number of plates 1 in the sections need not correspond to the actual conditions. The arrows provided in FIG. 8 for the high-pressure refrigerant and for the coolant of the condenser A correspond to the illustration in FIG. 10. The high-pressure refrigerant flows through the numerous first flow ducts 2a, and the coolant flows through the numerous second flow ducts 2b of the condenser A. FIG. 10 also shows an expansion element 3 which extends through an opening in the intermediate plate and which is situated partially in the discharge duct 4 of the high-pressure refrigerant in the condenser A and partially in the supply duct 4 of the refrigerant in the evaporator C. The insertion opening 10 (bottom) has been closed off by an indicated closure 12.

What is claimed is:

1. A refrigeration system comprising:
   a first fluid including a refrigerant;
   a second fluid;
   a third fluid;
   a heat exchanger including,
      a plurality of stacked plates each including an aperture,
      first and second flow ducts formed from the plurality of stacked plates,
      a first heat exchange section including at least one of the first flow ducts and at least one of the second flow ducts, the first heat exchange section configured as a condenser and the first fluid flows through the at least one first flow duct of the first heat exchange section,
      a second heat exchange section including at least one of the first flow ducts and at least one of the second flow ducts, the second heat exchange section configured as an evaporator and the first fluid flows through the at least one first flow duct of the second heat exchange section,
   inflow and outflow ducts formed by the apertures in the plurality of stacked plates for the first, second, and third fluids; and
   an expansion element for the first fluid operatively connected to the heat exchanger,
   wherein in the first heat exchange section the first fluid is in heat-exchanging contact with the second fluid, and
   wherein in the second heat exchange section the first fluid is in heat-exchanging contact with the third fluid,
   wherein the heat exchanger includes a third heat exchange section configured as an intermediate heat exchanger, wherein the third heat exchange section includes at least one of the first flow ducts and at least one of the second flow ducts, wherein the first fluid in the at least one first flow duct of the third heat exchange section is at a high temperature and in heat exchanging contact with the first fluid at a low temperature in the at least one second flow duct of the third heat exchange section.

2. The refrigeration system of claim 1, wherein the third heat exchange section is arranged between the first heat exchange section and the second heat exchange section.

3. The refrigeration system of claim 2, wherein the expansion element is positioned between the second heat exchange section and the third heat exchange section.

4. The refrigeration system of claim 1, wherein the first and second flow ducts are positioned in the first, second and third heat exchange sections.

5. The refrigeration system of claim 1, wherein the second fluid flows through the second flow duct of the first heat exchange section, and wherein the second fluid circulates as a first liquid coolant in a separate cooling circuit which includes a cooler for cooling the first liquid coolant.

6. The refrigeration system of claim 1, wherein the third fluid flows through the second flow duct of the second heat exchange section, and wherein the third fluid is a second liquid coolant.

7. The refrigeration system of claim 6, wherein the second liquid coolant includes a water-glycol mixture.

8. The refrigeration system of claim 6, wherein after exiting the second heat exchange section, the third fluid cools an auxiliary component before passing again through the second heat exchange section.

9. The refrigeration system of claim 8, wherein the auxiliary component includes an air-conditioner configured to cool at least one of an interior space, a battery, and an electrical component.

10. The refrigeration system of claim 1, wherein the second heat exchange section includes an inflow duct, and wherein the expansion element is positioned in the inflow duct of the second heat exchange section.

11. The refrigeration system of claim 10, wherein the inflow duct including the expansion element receives the first fluid exiting the first heat exchange section.

12. The refrigeration system of claim 10, wherein the inflow duct including the expansion element receives the first fluid exiting the third heat exchange section.

13. The refrigeration system of claim 1, wherein an outflow duct for the first fluid is arranged coaxially with an inflow duct for one of the first, second, and third fluids.

14. The refrigeration system of claim 1, wherein an outflow duct for the first fluid is arranged coaxially with an outflow duct for one of the first, second, and third fluids.

15. The refrigeration system of claim 1, wherein the first and second flow ducts alternate by being formed by opposite sides of at least two adjacent plates of the plurality of stacked plates.

16. The refrigeration system of claim 1, wherein the first and second flow ducts are positioned in the first and second heat exchange sections.

17. A refrigeration system comprising:
a first fluid including a refrigerant;
a second fluid;
a third fluid;
a heat exchanger including,
   a plurality of stacked plates each including an aperture,
   first and second flow ducts formed from the plurality of stacked plates,
   a first heat exchange section including at least one of the first flow ducts and at least one of the second flow ducts, the first heat exchange section configured as a condenser and the first fluid flows through the at least one first flow duct of the first heat exchange section,
   a second heat exchange section including at least one of the first flow ducts and at least one of the second flow ducts, the second heat exchange section configured as an evaporator and the first fluid flows through the at least one first flow duct of the second heat exchange section,
inflow and outflow ducts formed by the apertures in the plurality of stacked plates for the first, second, and third fluids; and
an expansion element for the first fluid operatively connected to the heat exchanger,
wherein in the first heat exchange section the first fluid is in heat-exchanging contact with the second fluid, and
wherein in the second heat exchange section the first fluid is in heat-exchanging contact with the third fluid,
wherein the second heat exchange section includes an inflow duct formed by the apertures in the plurality of stacked plates,
wherein the first heat exchange section includes an outflow duct formed by the apertures in the plurality of stacked plates, and
wherein the expansion element is positioned within at least one of the inflow duct of the second heat exchange section and the outflow duct of the first heat exchange section.

18. The refrigeration system of claim 1, wherein the plurality of stacked plates includes a first plate and a second plate, the first plate including a turned-up encircling edge that seals to a turned-up encircling edge of the second plate.

19. The refrigeration system of claim 17, wherein the expansion element is located within at least one of the first flow ducts.

20. The refrigeration system of claim 19, wherein the expansion element extends through at least two plates of the plurality of stacked plates.

21. The refrigeration system of claim 17, wherein the heat exchanger further includes a third heat exchange section disposed between the first heat exchange section and the second heat exchange section, and wherein the expansion element is located within the aperture of one of the plurality of plates disposed between the third heat exchange section and the second heat exchange section.

* * * * *